(12) United States Patent
Oakley et al.

(10) Patent No.: US 6,483,797 B1
(45) Date of Patent: Nov. 19, 2002

(54) APPARATUSES AND METHODS FOR READING AFTER WRITING IN OPTICAL RECORDING SYSTEMS

(75) Inventors: William S. Oakley, Burlingame; Mahdad Manavi, San Jose; A. Joel Mannion, Sunnyvale, all of CA (US)

(73) Assignee: Lots Technology, Inc., Longmont, CO (US)

( * ) Notice: Subject to any disclaimer, the term of this patent is extended or adjusted under 35 U.S.C. 154(b) by 2 days.

(21) Appl. No.: 09/642,185

(22) Filed: Aug. 17, 2000

Related U.S. Application Data

(60) Provisional application No. 60/149,959, filed on Aug. 20, 1999.

(51) Int. Cl.[7] .............................................. G11B 7/00
(52) U.S. Cl. ........................... 369/112.01; 369/112.29; 369/44.23
(58) Field of Search .......................... 369/44.14, 44.15, 369/44.16, 44.23, 44.37, 44.38, 112.01, 112.29, 112.28, 112.21, 96, 97

(56) References Cited

U.S. PATENT DOCUMENTS

| | | | | |
|---|---|---|---|---|
| 4,556,964 A | * | 12/1985 | Trethewey | 250/201.5 |
| 4,793,696 A | * | 12/1988 | Suh | 359/223 |
| 4,888,759 A | | 12/1989 | Hazel et al. | |
| 5,068,843 A | * | 11/1991 | Takeshita et al. | 369/44.13 |
| 5,115,420 A | * | 5/1992 | Finkelstein et al. | 369/107 |
| 5,633,851 A | * | 5/1997 | Kahlman et al. | 250/236 |
| 5,719,846 A | * | 2/1998 | Matoba et al. | 359/291 |
| 6,002,661 A | * | 12/1999 | Abe et al. | 369/112.29 |
| 6,141,301 A | * | 10/2000 | Oakley | 369/112.1 |

* cited by examiner

Primary Examiner—Thang V. Tran
(74) Attorney, Agent, or Firm—Blakely, Sokoloff, Taylor & Zafman LLP

(57) ABSTRACT

A read-after-write system for optical recording systems includes a mirror used to direct read beams to a desired position on a recording medium relative to write beams impinging on the recording medium. The mirror may be adjustable to direct the read beams through a range of possible positions.

30 Claims, 11 Drawing Sheets

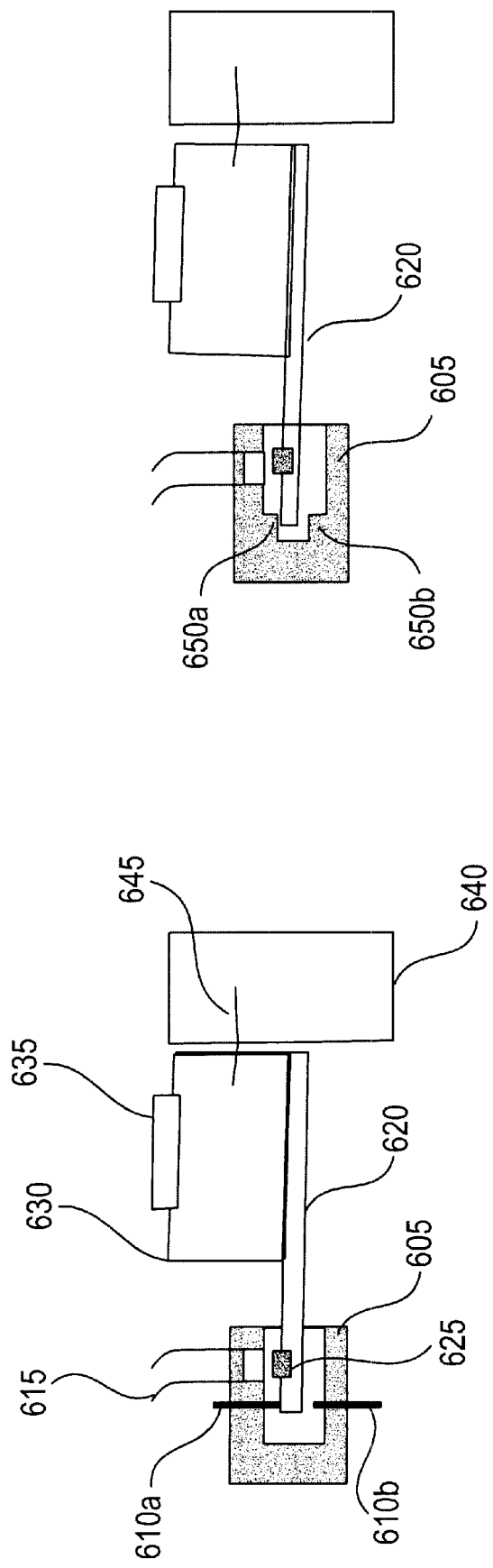

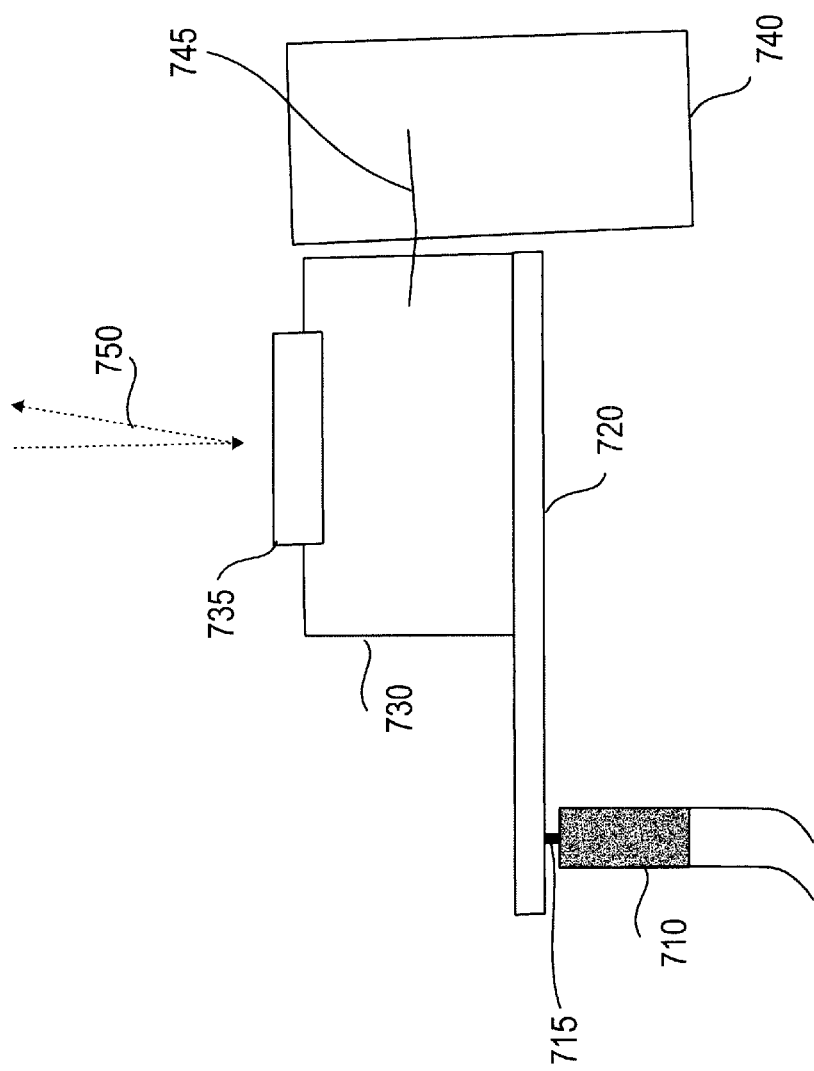

APPARATUSES AND METHODS FOR READING AFTER WRITING IN OPTICAL RECORDING SYSTEMS

CLAIM OF PRIORITY

This application claims the benefit of U.S. Provisional Application No. 60/149,959, filed Aug. 20, 1999, entitled "'Read After Write' Function for Multiple Beam Optical Recording Systems" by Oakley et al.

BACKGROUND OF THE INVENTION

1. Field of the Invention

The present invention relates generally to optical recording systems having read-after-write features.

2. Background Information

In many data recording systems a method and/or system for reading the data immediately after it is written is implemented so that the accuracy of the recorded data can be ascertained. In linear magnetic tape systems for example, the read/write head array is duplicated in close proximity to enable write verification with the tape moving in either direction. In optical disc systems the read-after-write function is usually implemented by a consecutive turn of the disc. The read-after-write (RAW) function is considered necessary for a viable recorder, and it is therefore desirable to implement a near simultaneous read after write for linear optical tape systems.

In systems using multiple optical beam writing, the data is typically written in a defined block size down the tape and across multiple write channels. Tape surface errors prevent perfect error free recording and an error correcting coding (ECC) scheme is implemented to remove the effects of such errors on the recorded data. With an immediate RAW it is possible for the system to evaluate to what extent the ECC is being utilized to correct the written errors back to an acceptable level. If the written data cannot be immediately retrieved with sufficient fidelity via the ECC circuits, the optical tape system is configured to re-write the unrecoverable data block. Block rewrites are implemented until either accurate data is recovered or until a pre-set number of rewrites have failed, at which point system failure is indicated. The degree to which the ECC is being utilized to correct the recovered data can also be monitored so that data can be retrieved and duplicated before insufficient ECC is available and the data to becomes unrecoverable.

For simultaneous multiple beam writing using, for example, an array of 4×8 beams in an equally spaced rectangular matrix, it is desirable to read each data bit shortly after it is written. This requires a trailing matrix of 4×8 optical beams at the reduced read light intensity, regardless of the direction in which the recording media is traveling. In systems using arrays of laser diodes, this requires a second array of laser diodes similar to the write array, with the write and read functions being alternated.

SUMMARY OF THE INVENTION

The present invention provides an optical apparatus including a mirror for an optical recording system. The mirror is coupled to an adjustable base which is moveably coupled to a fixed support. The adjustable base is adjustable to orient the mirror in at least a first position to reflect reading light beams of the optical recording system onto a recording medium.

The present invention also provides a method of performing a read-after-write operation in an optical recording system. The method includes adjusting a mirror to a first angled position or a second angled position, directing an unmodulated light beam from a light source to the mirror to reflect the light beam onto a lens, and using the lens to focus the unmodulated light beam on a recording medium to read a written track on the recording medium.

Additional features and benefits of the present invention will become apparent upon review of the following description.

BRIEF DESCRIPTION OF THE DRAWINGS

Various embodiments of the present invention will be described in detail with reference to the following drawings. The present invention is illustrated by way of example and not limitation in the accompanying figures.

FIG. 7A illustrates another embodiment of an open loop electromagnetically driven RAW mirror actuation system having adjustable stops.

FIG. 7B illustrates the system of FIG. 7A having fixed stops.

FIG. 8 illustrates a RAW mirror actuation system having a PZT translator.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

One type of multiple beam writing system implemented in the present invention employs a single laser source which is split into a multiple beam write array by means of a hologram, each beam of which is then capable of being individually modulated. In the present invention, the modulation is achieved by a reflective modulator array configured into a matching N×M pattern of modulating elements, where typically M=8 and N=1, 2, 4, 8 etc. A read-after-write (RAW) capability in such a multiple beam recording system is achieved by implementing a read beam array that matches the write beam array, but located in a trailing position along the written data tracks.

Such a-trailing read array can be achieved by positioning a partially reflective mirror in the optical path to and from the modulator such that a portion of each input beam in the array is returned unmodulated to the recording media surface. The RAW mirror is positioned in the collimated portion of the beam so that when modulated write beams and unmodulated read beams arrive at the media surface they are located in the same focal plane. In one embodiment, this partially reflective mirror is adjustable in angle such that a portion of the input beam array can be returned to the immediate trail position relative to a write beam regardless of the direction of media travel. The RAW mirror adjustment is about an axis tilted to the array pattern so the read array is located down track of the write array regardless of the rotation of the write array to the direction of media travel.

Figure 1:
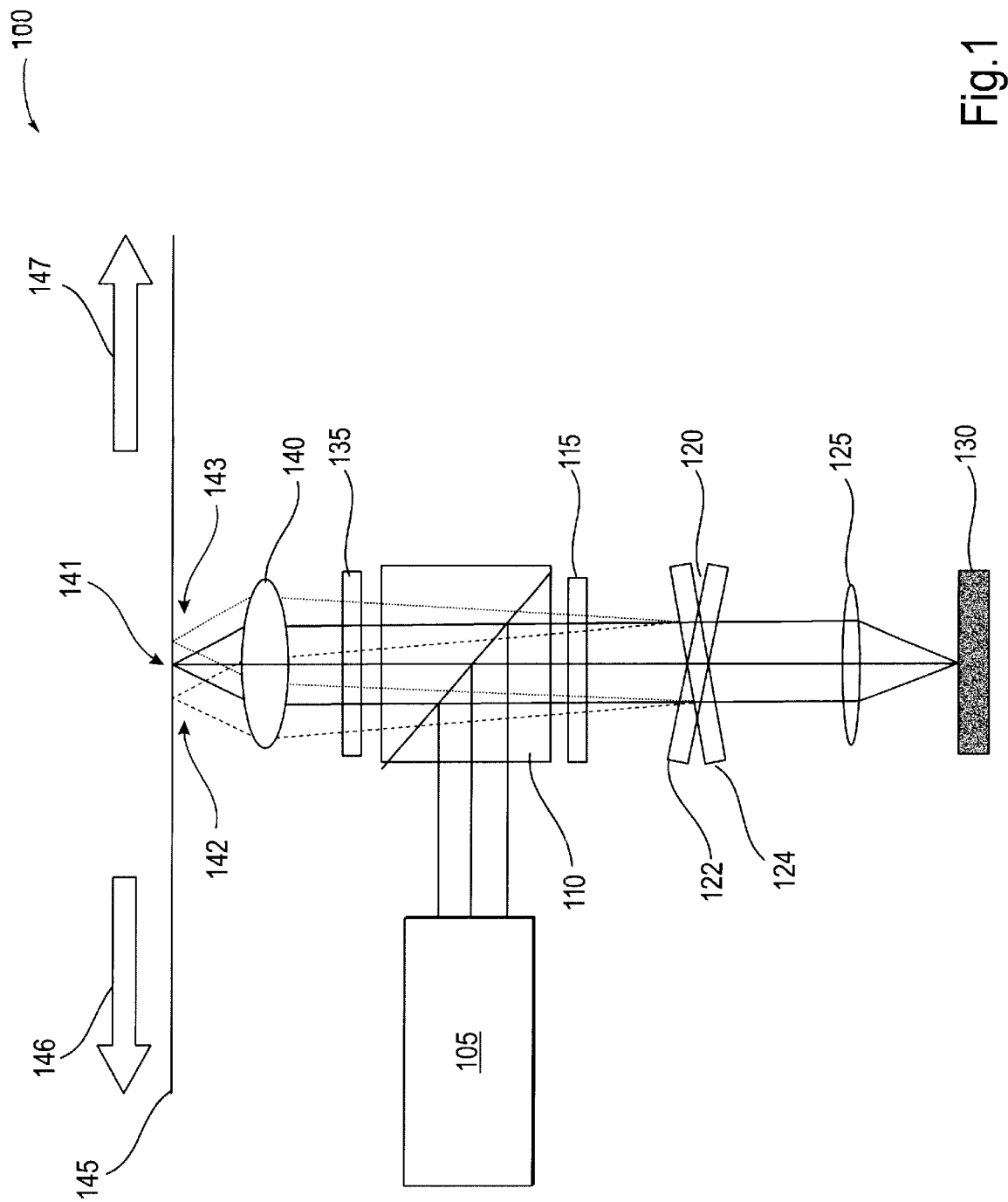
FIG. 1 illustrates an embodiment of an optical recording system having a tiltable read-after-write (RAW) mirror.

FIG. 1 illustrates an implementation of an adjustable partially reflecting mirror 120 in an optical recording system 100, such as a multiple beam optical recording system. A light source 105, such as a laser, emits light beams to a polarizing beam-splitter 110. The light beams exit polarizing beam-splitter 110 to quarter wave plate 115. After passing through quarter wave plate 115, the light beams encounter RAW mirror 120, which is only partially reflective in the embodiment of the present invention shown in FIG. 1. Actuation of the RAW mirror 120 to a first angled position 122 or a second angled position 124 moves the reflected portion (read beams) of the light beams either to the right 143 or the left 142, respectively, of the writing beam 141 in each track. The read beam location is approximately midway between the write beams on adjacent tracks to minimize interference with the write beams and interference of the write beam with the read function. This allows the forward read beam of one track to possibly use the same detector as the trailing beam of the adjacent track. The range of reflectivity of the RAW mirror 120 is typically 5%–10%.

The portion of the light beams which passes through RAW mirror 120 continue on to focusing lens 125 and are focused into a reflective spatial light modulator 130. The light beams are modulated by modulator 130 to form write beams which are reflected from modulator 130 back through lens 125 which recollimates the beams, RAW mirror 120, quarter wave plate 115 and beam-splitter 110. The write beams then pass through another quarter wave plate 135 to a focusing objective lens 140, which focuses the write beams on a recording medium 145. As the tracks are being written on recording medium 145, the read beams read the tracks immediately thereafter because the read beams are already in their read positions. Because recording medium 145 may move in a reverse direction 146 or a forward direction 147, RAW mirror 120 is adjustable to direct the read beams to their correct read positions. For example, if recording medium 145 is moving in the reverse direction 146, then RAW mirror 120 is tilted to position 124 to direct the read beams to position 142 on recording medium 145 (to the left of write beams 141). If recording medium 145 is moving in the forward direction 147, then RAW mirror 120 is tilted to position 122 to direct the read beams to position 143 on recording medium 145 (to the right of write beams 141).

Figure 2:
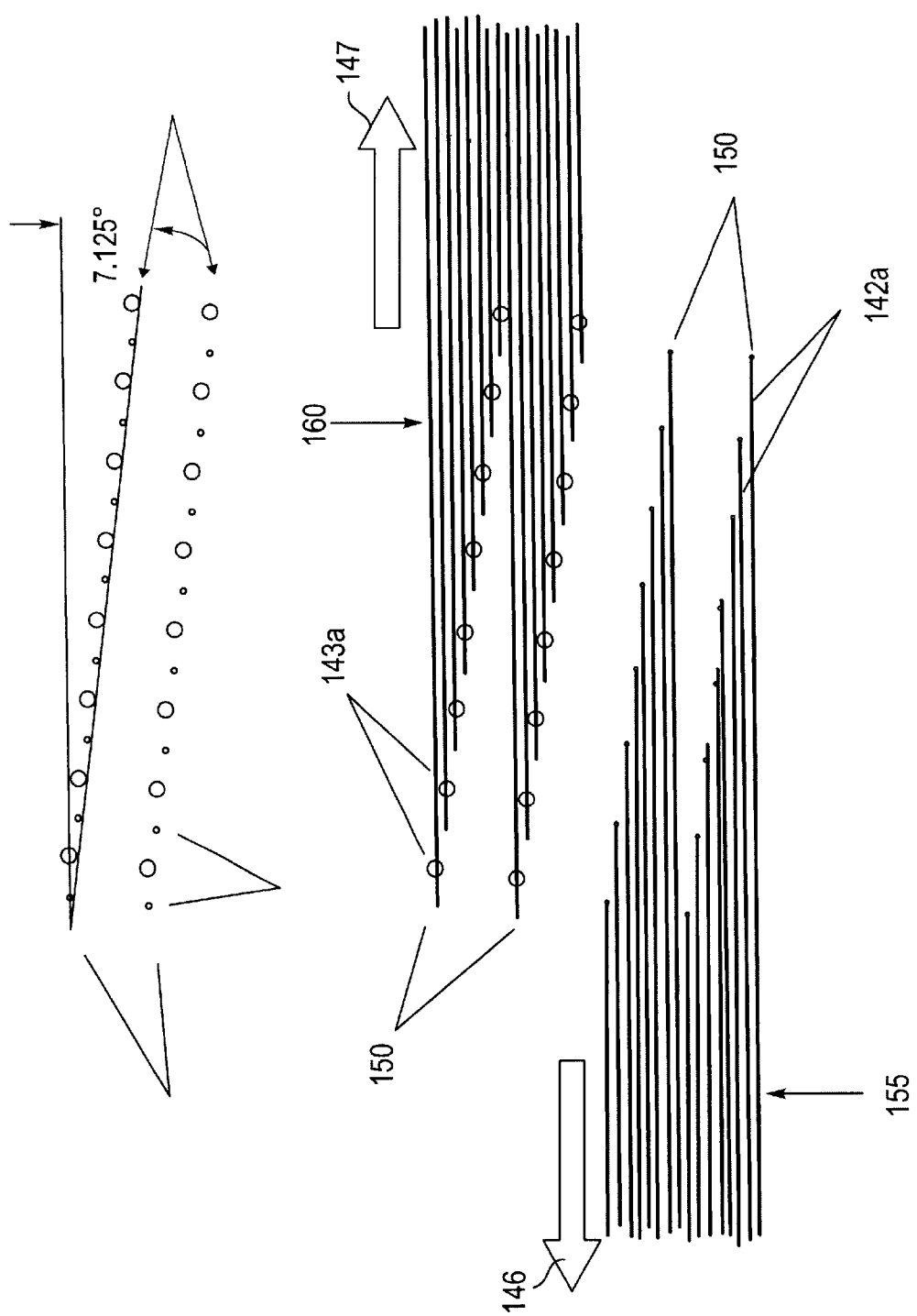
FIG. 2 illustrates examples of a trailing read beam array relative to a write beam array at a tape plane.

FIG. 2 illustrates examples of trailing read beam arrays 142a or 143a relative to a write beam array 150 at the plane of a recording medium. Read beam arrays 142a and 143a and write beam array 150 are 2×8 arrays. When the recording medium moves in a forward direction 147, written tracks 160 are read by read beam array 143a having read beams located in a trailing position relative to the write beams in write beam array 150. When the recording medium moves in a reverse direction 146, written tracks 155 are read by read beam array 142a having read beams located in a trailing position relative to the write beams in write beam array 150. In embodiments of the present invention using multiple beam arrays (N×M), a method and/or system for achieving equal track spacing while writing onto the recording medium may be obtained by tilting the optical head by an angle equal to $\text{Tan}^{-1}(1/M)$ about a symmetry axis normal to plane of the beam array. In the embodiment of the present invention where the optical head is tilted relative to the recording medium path, and where the written multiple data tracks are parallel to the tape path, the RAW mirror rotational direction is parallel to the tape path so that the trailing read beam array 142a or 143a is in line with the write beam array 150 at the recording medium plane regardless of the direction of motion 146 or 147 of the recording medium. To achieve this, the RAW mirror mount may be tilted by negative $\text{Tan}^{-1}(1/M)$ relative to the optical head.

Figure 3:
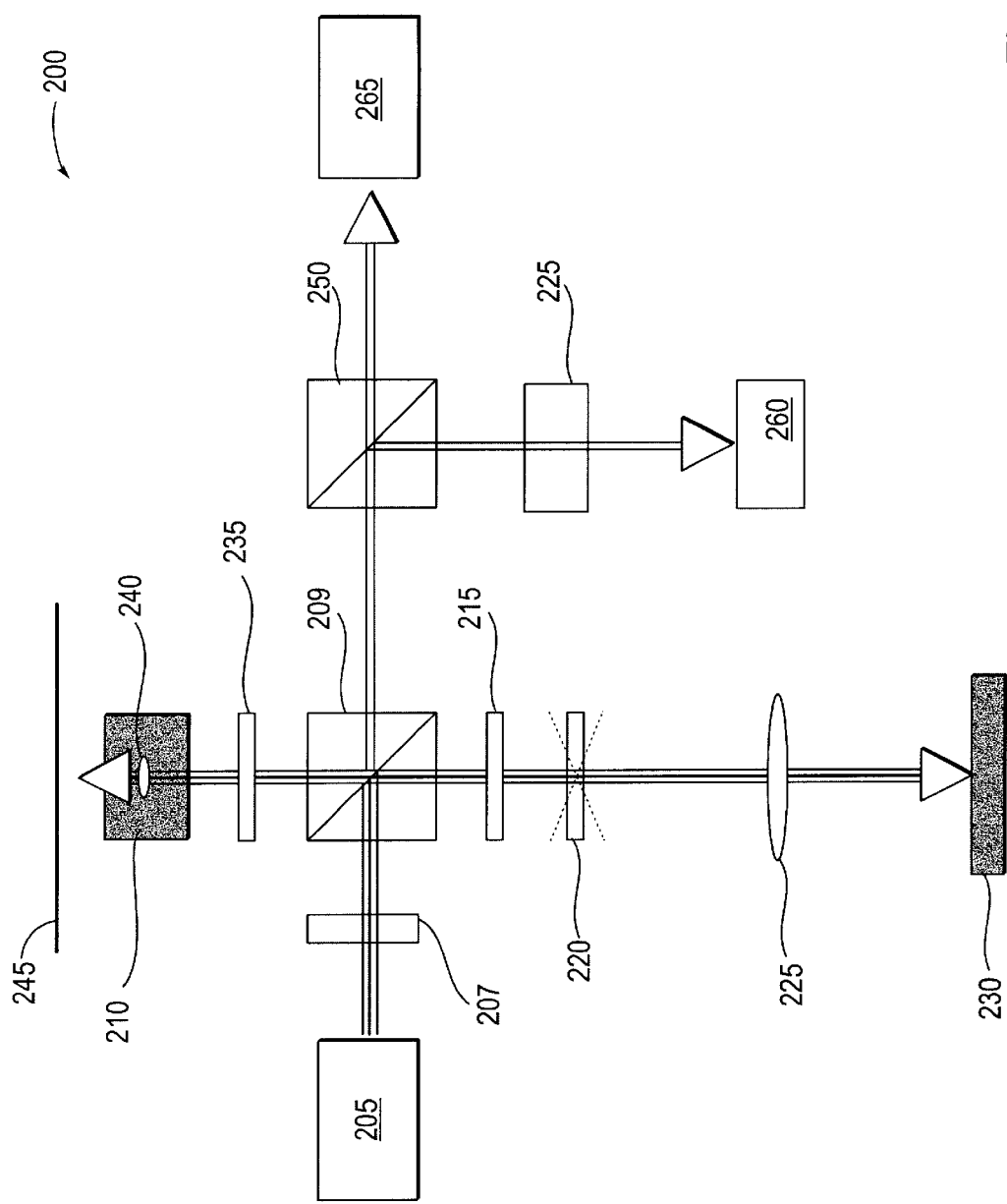
FIG. 3 illustrates another embodiment of an optical recording system having a tiltable RAW mirror.

In one embodiment of an optical recording system 200 shown in FIG. 3, a light source 205 emits a light beam to a beam-forming hologram 207, which splits the light beam into a multiple beam array. The light beams then enter a polarizing beam-splitter cube 209 which directs the light beams to a quarter wave plate 215. After passing through quarter wave plate 215, the light beams impinge on RAW mirror 220, which is similar to mirror 120 described in conjunction with FIG. 1. The portion of the light beams which passes through mirror 220 travels to focusing lens 225. The light beams are individually focussed onto a reflective spatial light modulator 230, and modulation is achieved for each beam by using polarization rotation at the modulator 230.

The portion of the light beams which are reflected from mirror 220 are read beams. The read beams may also be polarization rotated in order to enable them to pass back through beam-splitter 209. This is achieved by placing quarter wave plate 215 before the RAW reflector 220 so that the read beams pass through the retardation plate 215 twice before entering beam-splitter 209 again. When such a wave plate 215 is in place, the beams passing through it to the modulator 230 are circularly polarized. If the modulator 230 requires linearly polarized light to achieve desired performance a second quarter wave plate may be interposed between the RAW device and the modulator 230 to provide the desired beam polarization. If the modulator 230 can operate in a bipolar mode with a circularly polarized optical input, then the second quarter wave plate does not have to be used.

Both the read beam array and the write beam array travel back through beam-splitter 209 to another quarter wave plate 235 and then to a focusing objective lens 240 which is controlled by a focus and track actuator 210. The read beam array and write beam array are focused onto a recording medium 245. The read beam array and the write beam array are positioned relative to each other as described above in conjunction with FIGS. 1 and 2; mirror 220 is also adjustable to different angled positions according to the direction of movement of recording medium 245. Objective lens 240 is adjusted to a desired focal position by focus and track actuator in conjunction with signal feedback provided by a focus and track detector 260. Beams are reflected from recording medium 245 back to beam-splitter 209 which then reflects the beams to a beam-splitter 250. The beams are then received and processed by focus and track detector 260 and data detector 265 to provide information regarding the positioning of objective lens 240 and the written tracks on recording medium 245. Optical elements 255, such as a lens system, direct the beams that are reflected from beam-splitter 250 to focus and track detector 260.

Figure 4:
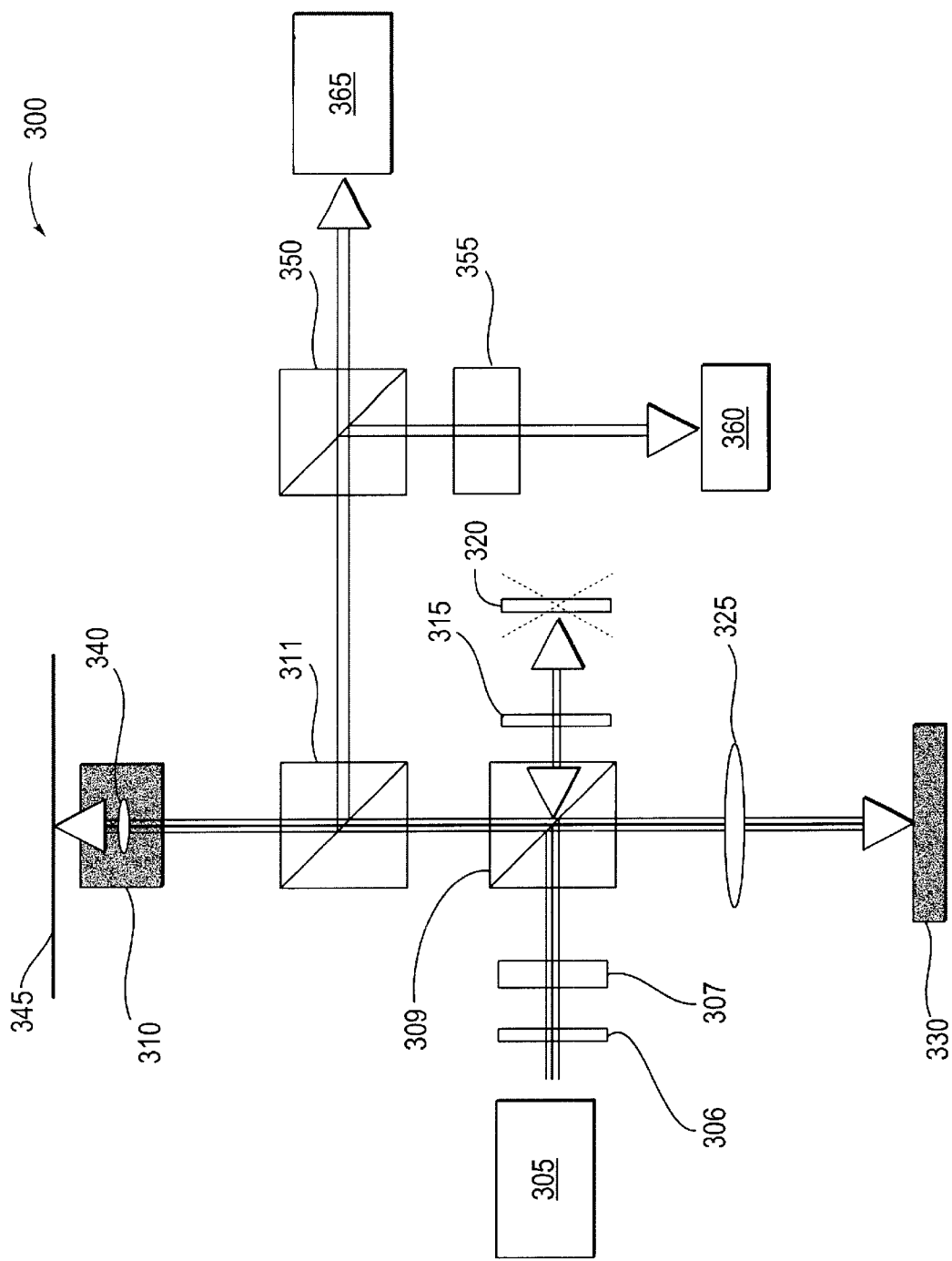
FIG. 4 illustrates yet another embodiment of an optical recording system having a tiltable RAW mirror.

FIG. 4 illustrates another optical recording system 300 according to the present invention. In this embodiment, the RAW mirror 320 is nominally 100% reflective and is located as shown. The input beam array from the laser source 305 (via beam-forming hologram 307) is highly polarized by the time the array reaches mirror 320, and the plane of polarization is rotated slightly with respect to the orientation of polarizing beam-splitter 309 so that a selected portion of each beam is reflected off beam-splitter 309 in one polarization state (e.g. "S") to a reflective spatial light modulator 330 via a focusing lens 325. Beam splitter 309 typically reflects greater than 98% of S-polarized light, and typically transmits greater than 97% of P-polarized light. Polarization rotation of the source beam array may be achieved by either rotating the laser head from its nominal horizontal orientation or by introducing a half wave plate 306 with optical axes rotated relative to the laser polarization direction. The remaining light in each beam is transmitted through beam-splitter 309 to the RAW mirror 320 in the orthogonal polarization state (e.g. "P").

A quarter wave plate 315 is located between beam-splitter 309 and RAW mirror 320 so that each beam returning from RAW mirror 320 is polarization rotated by 90 degrees and is thereby fully reflected off beam-splitter 309 in the S state. In a similar manner, S light from light source 305 reflecting off beam-splitter 309 passes to the modulator 330 and each element of the beam array is then focused onto the modulator 330. Each beam reflects individually from the modulator 330 and returns to light source 305 as S light unless the corresponding modulator element (not shown) is active. When any modulator element is active, the corresponding reflected beam is polarization rotated by 90 degrees, and the returning P light is thereby transmitted through beam-splitter 309 instead off reflecting back to light source 305. This write beam array is then nominally co-linear with the array of S read beams returned from RAW mirror 320, except for the intentional RAW beam angular offset created by the tilting of RAW mirror 320.

Both the modulated beam array returning from the modulator path in the P state and the RAW beam array in the S state returning from RAW mirror 320 pass through another polarizing beam-splitter 311. Beam splitter 311 is designed to highly transmit the P-polarized write beams to a focusing lens 340 and then recording medium 345, and to pass nominally 50% of the S-polarized read beams to focusing lens 340 and then recording medium 345, while also reflecting about 50% of the read beams. The read beams return in the S state from recording medium 345 and are reflected from beam-splitter 311 into the servo and data detection path to focus and track detector 360 and data detector 365 via beam-splitter 350. Focusing lens 340 is controlled by a focus and track actuator 310. Optical elements 355, such as a lens system, direct the beams that are reflected from beam-splitter 350 to focus and track detector 360. Unwanted write beam energy reflected from recording medium 345 returns to beam-splitter 311 in the P state and is directed toward modulator 330 via beam-splitter 309.

Figure 5:
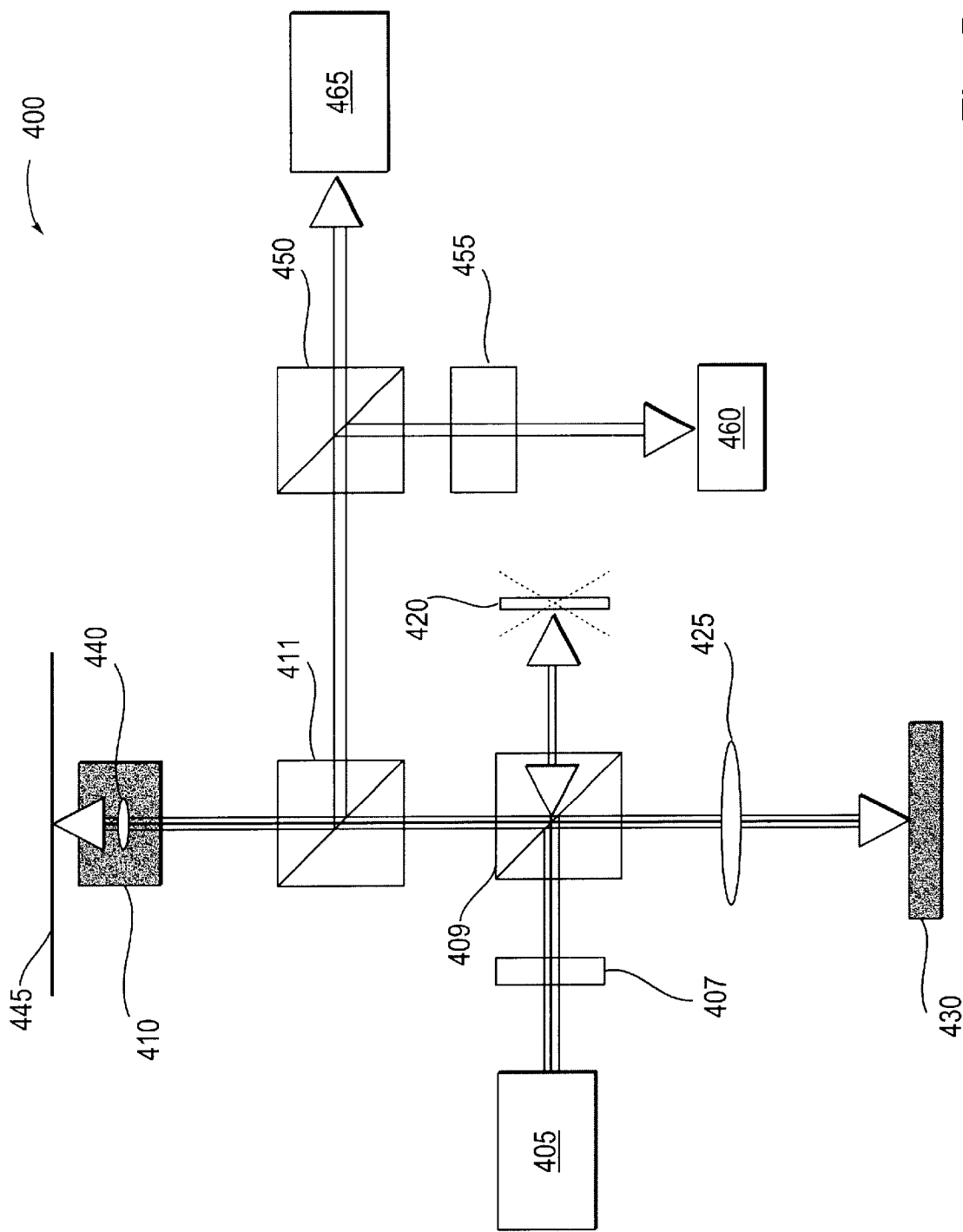
FIG. 5 illustrates still another embodiment of an optical recording system having a tiltable RAW mirror.

A variation of the embodiment of FIG. 4 is shown in FIG. 5. In optical recording system 400, the half-wave and the quarter-wave plates are removed. The RAW mirror 420 is nominally 100% reflective and is located as shown. The input beam array from the laser source 405 (via beam-forming hologram 407) is highly polarized and the plane of polarization is vertical (S-polarized) which is parallel to the orientation. of polarizing beam-splitter 409. Beam splitter 409 is designed to highly transmit P-polarized beam, and to pass nominally 10% of the S-polarized beam, while also reflecting about 90% of the S-polarized beam. Therefore, the nominal 10% of the S-polarized light in each beam is transmitted through beam-splitter 409 to RAW mirror 420. Each beam returning from RAW mirror 420 is still in the S-polarized state and is reflected off beam-splitter 409 in the same S state. In a similar manner, S-polarized light from light source 405 reflecting off beam-splitter 409 passes to modulator 430 and each element of the beam array is then focused onto modulator 430 via focusing lens 425. Each beam reflects individually from modulator 430 and is returned to light source 405 as S light unless the corresponding modulator element (not shown) is active. When any modulator element is active, the corresponding reflected beam is polarization rotated by 90 degrees, and the returning P light is thereby transmitted through beam-splitter 409. This write beam array is then nominally co-linear with the array of S read beams returned from RAW mirror 420, except for the intentional RAW beam angular offset created by the tilting of RAW mirror 420.

Both the modulated beam array returning from the modulator path in the P state and the RAW beam array in the S state returning from RAW mirror 420 pass through another beam-splitter 411. Beam splitter 411 is designed to highly transmit the P-polarized write beams from modulator 430, and to pass nominally 50% of the S-polarized read beams from RAW mirror 420, while also reflecting about 50% of the read beams. The read beams return in the S state from recording medium 445 and are reflected from beam-splitter 411 into the servo and data detection path to focus and track detector 460 and data detector 465 via beam-splitter 450. Focusing lens 440 is controlled by a focus and track actuator 410. Unwanted write beam energy reflected from recording medium 445 returns to beam-splitter 411 in the P state and is directed toward modulator 430 via beam-splitter 409.

Figure 6B:
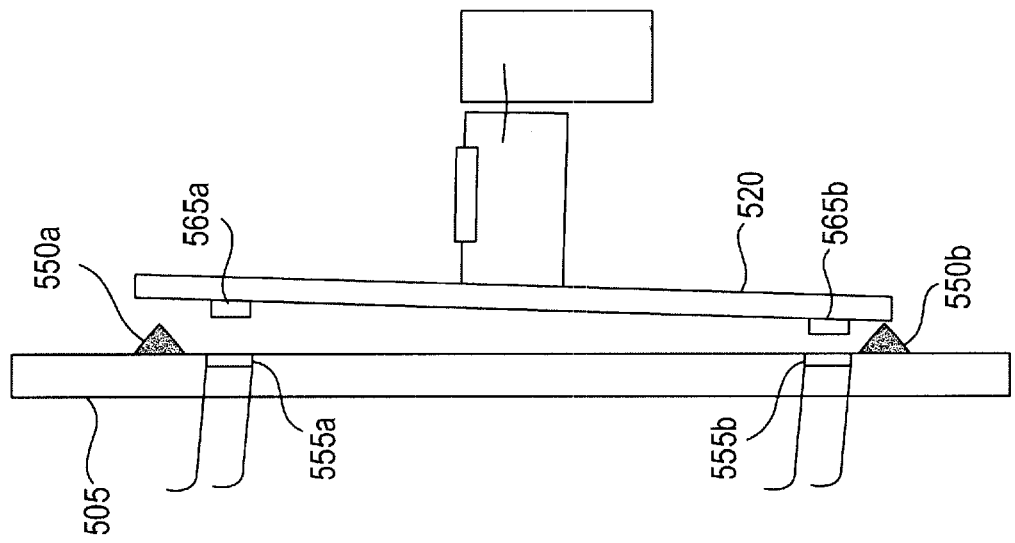
FIG. 6B illustrates the system of FIG. 6A having fixed stops.
Figure 6A:
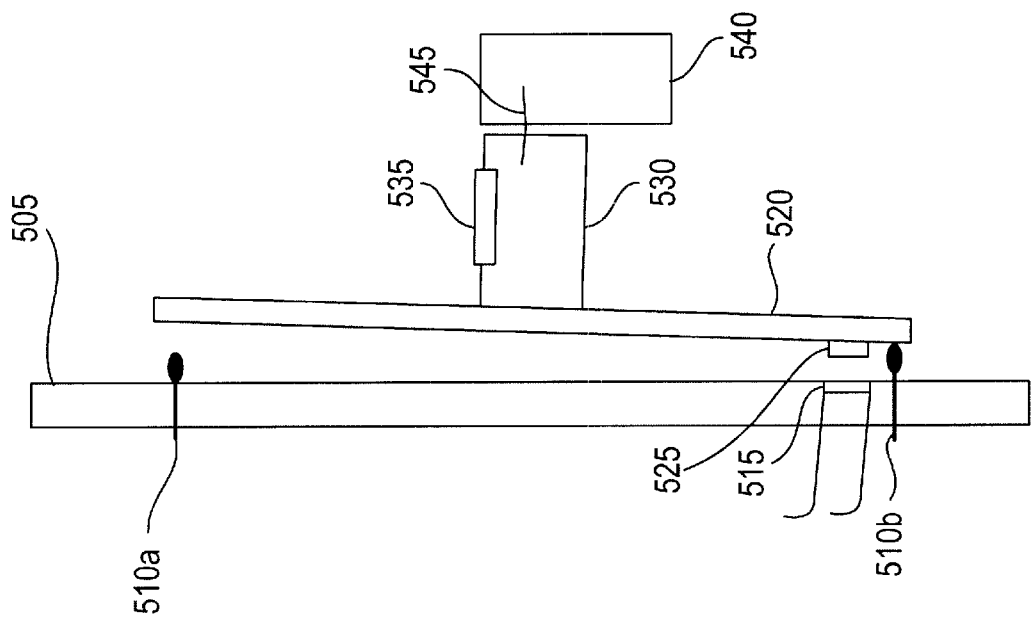
FIG. 6A illustrates an embodiment of an open loop electromagnetically driven RAW mirror actuation system having adjustable stops.

The angle of the light beams reflected from a RAW mirror can be determined by a closed loop servo system or by means of an open loop system using fixed position stops. Two open loop electromagnetically driven RAW actuation systems using adjustable stops are shown in FIGS. 6A and 7A. In these embodiments, the actuator operates between the trail positions for each direction of movement of the recording medium with each position independently adjustable by using adjustable position setting screws (510a, 510b and 610a, 610b). A second option as shown in FIGS. 6B and 7B is to implement stop blocks (550a, 550b and 650a, 650b) into which the range of travel is permanently set. The stop blocks may be adjustable to set the position of the travel range.

In FIG. 6A, a fixed structure 505 has adjustable position setting screws 510a and 510b disposed through fixed structure 505. A RAW mirror 535 is coupled to an adjustable base 530 which is integrally formed with a lever arm 520. Adjustable base 530 is coupled to a fixed base 540 by a flexure mount 545, which may be, for example, a thin wafer of stainless steel (e.g. thickness of approximately 0.003 in.) or other appropriate material. Thus, the RAW actuator shown in FIG. 6A is flexible to allow for a range of positions. In one embodiment, flexure mount 545 is stiff in the cross-axis direction to its rotation. A magnet 525 is bonded onto an end of lever arm 520 and is operated on by a corresponding electromagnetic coil 515 embedded in or attached to structure 505. Screws 510a and 510b may be adjusted to extend more or less from structure 505 to achieve a desired range of positions for RAW mirror 535. Accordingly, the light beams reflecting from RAW mirror 535 may reflect at one of a number of angles of reflection. In one embodiment of the present invention, the total angular throw of lever arm 520 is nominally 2 milliradians between the two stop positions.

In FIG. 6B, fixed structure 505 has hard position stops 550a and 550b protruding from a surface of fixed structure 505. Magnets 565a and 565b are disposed on opposite ends of lever arm 520. Electromagnetic coils 555a and 555b are embedded in structure 505 and operate on magnets 565a and 565b, respectively. Hard position stops 550a and 550b are shown as pointed extensions, but it is appreciated that they may be formed as blunt or planar extensions.

Although the embodiment of FIG. 6A is shown having one magnet and coil pair and the embodiment of FIG. 6B is shown having two magnet and coil pairs, it is appreciated that both embodiments may be configured with a single magnet and coil pair or two magnet and coil pairs. In embodiments having only one magnet and coil pair, the lever arm may be spring loaded against the position stop which is not adjacent an electromagnetic coil.

FIG. 7A illustrates another embodiment of an open loop electromagnetically driven RAW mirror actuation system having adjustable stops. A housing 605 accommodates adjustable position setting screws 610a and 610b which extend into the interior of housing 605. An electromagnetic coil 615 is embedded in or attached to a wall of housing 605 such that coil 615 faces the interior of housing 605. A lever arm 620 of the RAW mirror unit is positioned within housing 605 such that the end of lever arm 620 can contact screws 610a and 610b to define a range of movement of lever arm 620. A magnet coupled to the end of lever arm 620 is operated on by coil 615 to move lever arm 620 between the positions defined by screws 610a and 610b. Lever arm 620 is attached to or integrally formed with a main body 630. A RAW mirror 635 is coupled to main body 630. Main body 630 is moveably coupled to a fixed base 640 by a flexure mount 645.

In FIG. 7B, housing 605 is shown having hard position stops 650a and 650b, which may be blocks attached to the inner surface of housing 605 or protrusions integrally formed with the inner surface of housing 605. Lever arm 620 is moveable between the positions defined by hard position stops 650a and 650b.

Another embodiment of the RAW actuator is implemented as shown in FIG. 8 and uses a piezoelectric element 710, such as a lead zirconium titanate (PZT) translator, having a flexible hinge 715 to position a RAW mirror 735 in response to a served input from a read beam position detector. The position setting screw allows the actuator to be approximately set to mid range with voltage applied so that the full voltage swing covers the read locations in both tape directions. The full angular swing of the RAW mirror 735 may be, for example, ±1 milliradian from center which moves the read beam 750 into a trailing position about 5 microns from the write location. The embodiment shown in FIG. 8, if implemented with a long lever arm 720 of approximately 100 millimeters, may include a stroke between the position stops of about ±100 microns from center. Lever arm 720 is coupled to or integrally formed with a main body 730, on which RAW mirror 735 is located. Main body 730 is flexibly coupled to a fixed base 740 via a flexure mount 745. For a typical piezoelectric actuator based design, the effective lever arm is much shorter (e.g. 5 millimeters), and the piezoelectric movement is therefore nominally ±5 micrometers from the center position.

The preceding embodiments of a RAW mirror actuation system may be used in optical recording systems in accordance with the teachings of the present invention. It is appreciated that modifications may be made to the embodiments described herein and shown in the figures. For example, in optical recording systems using a partially reflective RAW mirror, the RAW mirror may by used without a main body or adjustable base. Instead of being coupled to a main body/adjustable base, the RAW mirror may be formed with side extensions: an extension that acts as the above described lever arm, and an extension that is flexibly coupled to a fixed base. Thus, light beams may pass through the RAW mirror.

Figure 10:
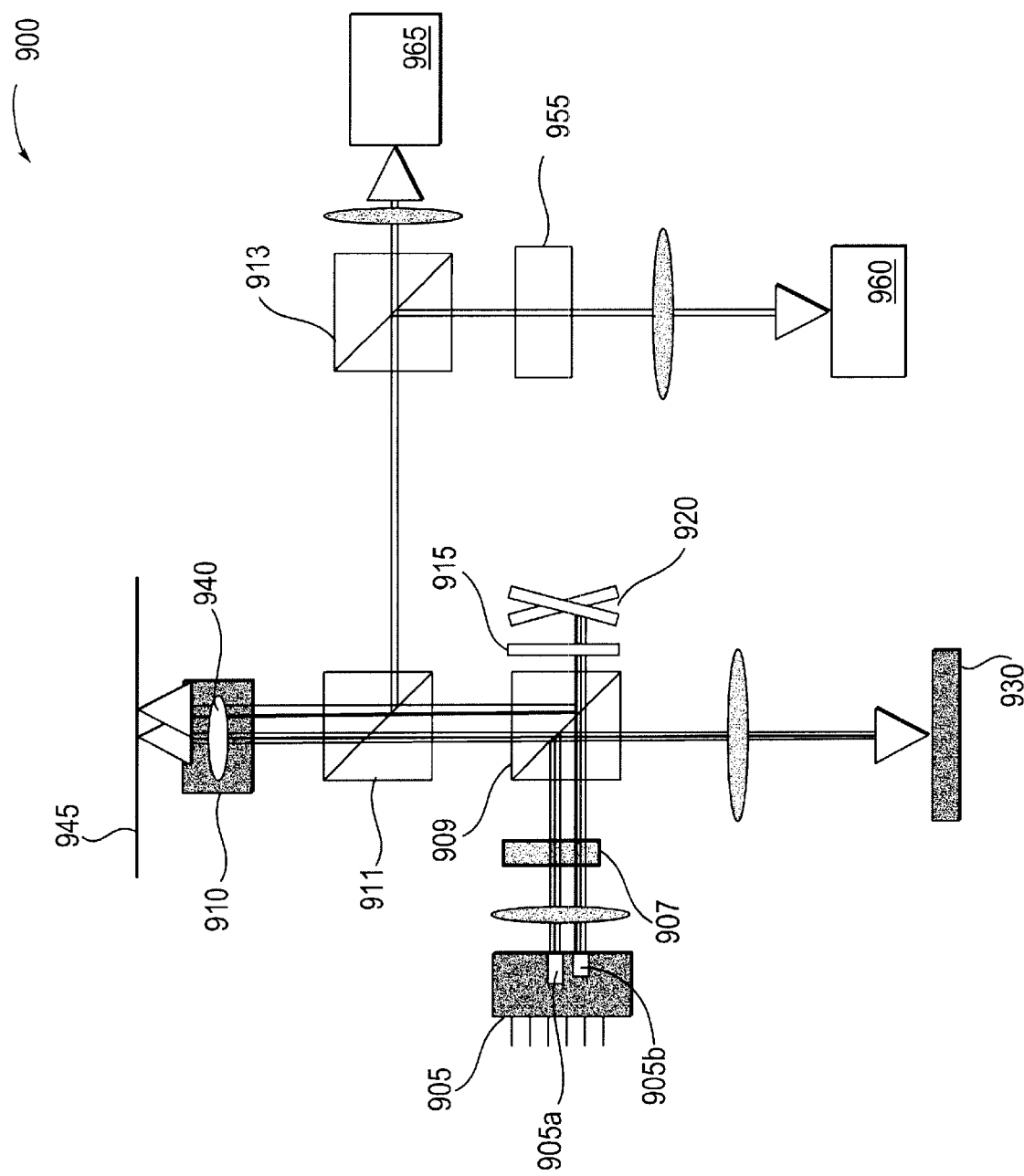
FIG. 10 illustrates another embodiment of a multiple source optical recording system having a tiltable RAW mirror.
Figure 11:
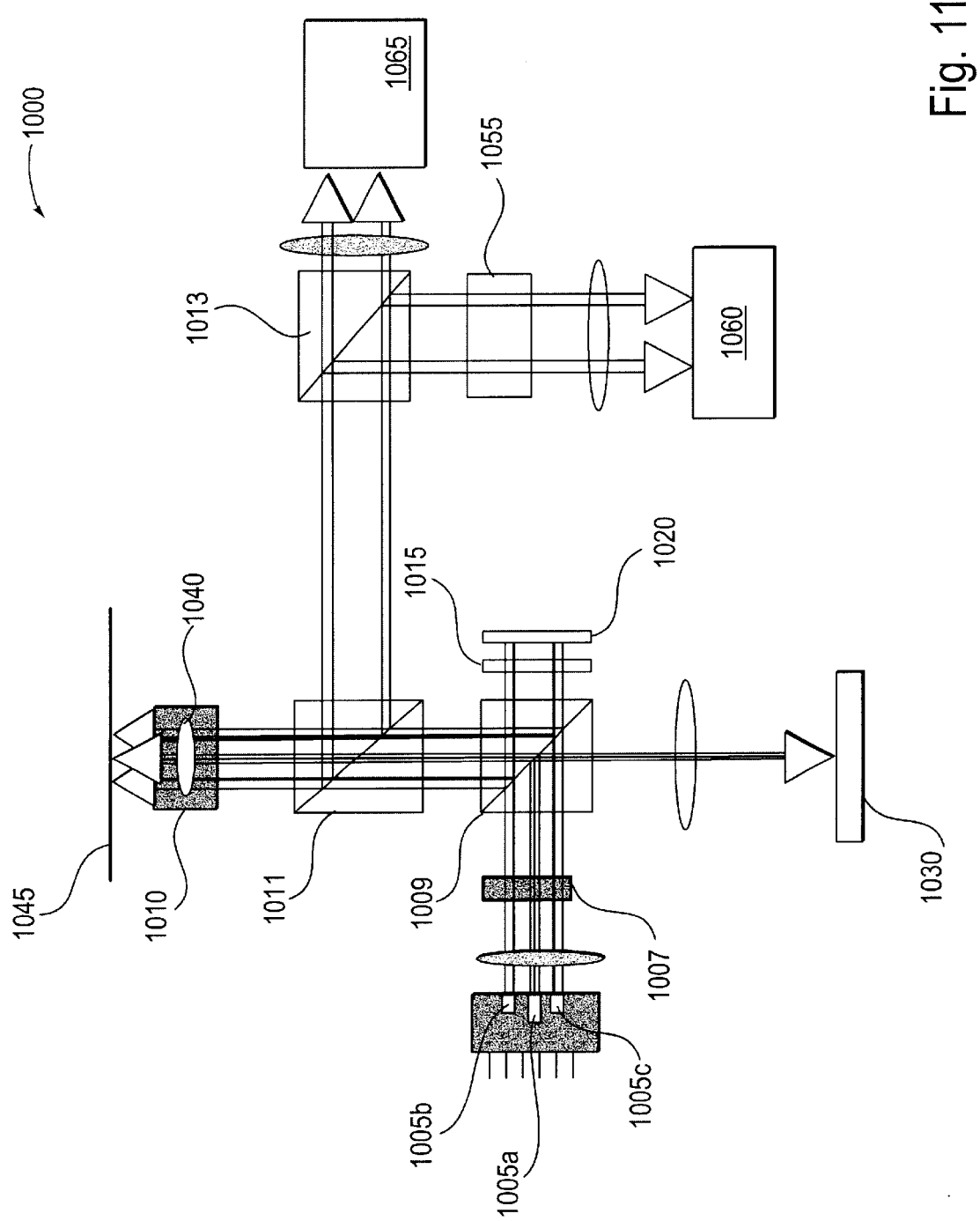
FIG. 11 illustrates yet another embodiment of a multiple source optical recording system having a tiltable RAW mirror.

The present invention also includes several embodiments for multiple source implementations. Such implementations are possible for systems employing multiple light sources, and examples of these systems are shown in FIGS. 9, 10 and 11.

Figure 9:
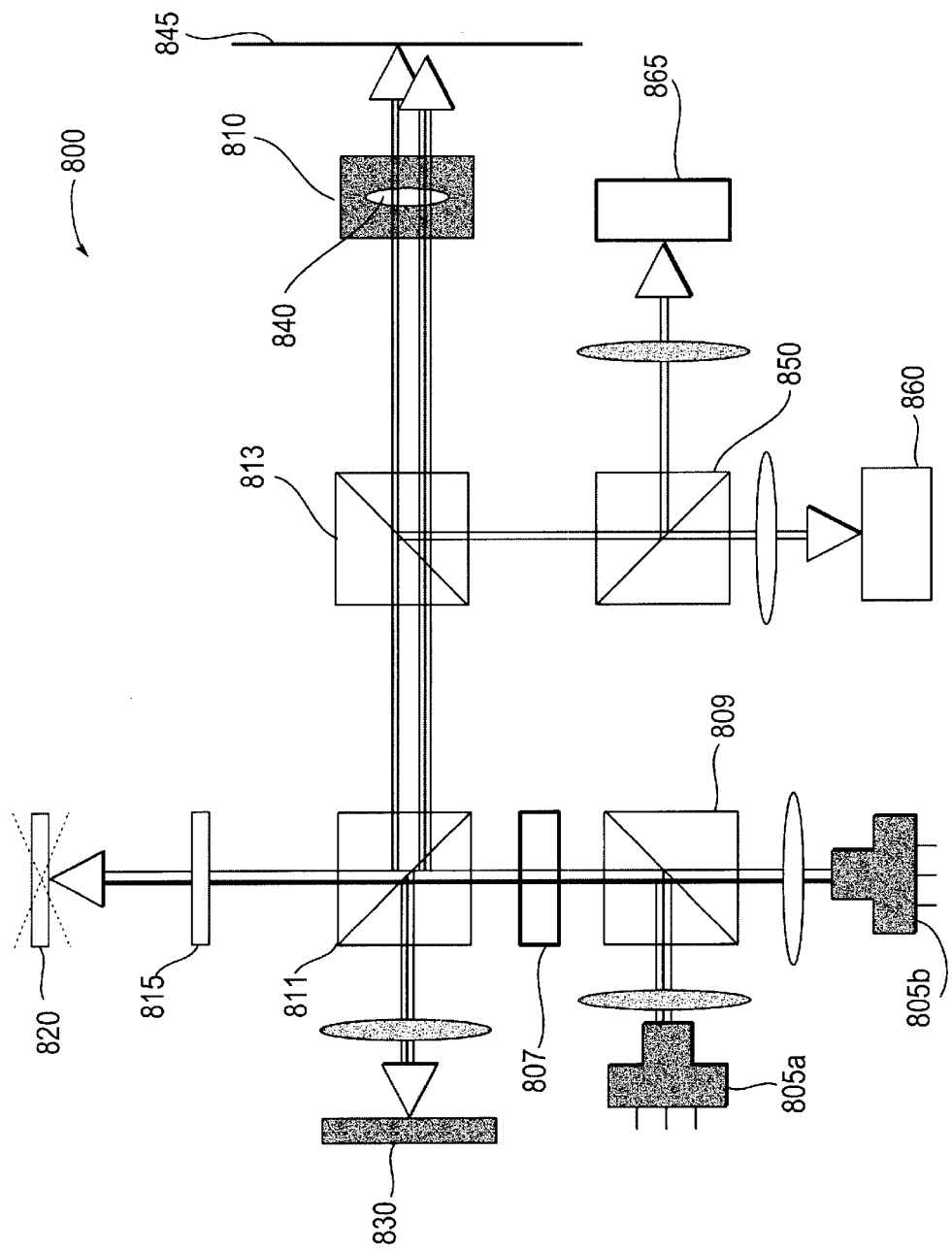
FIG. 9 illustrates one embodiment of a multiple source optical recording system having a tiltable RAW mirror.

In the optical recording system 800 shown in FIG. 9, two separate laser diodes 805a and 805b are used where one is high power (805a) and the other is low power (805b). The high power laser diode 805a is used for generating write beams and is polarized in the S state. The low power laser diode 805b is used for generating read beams and is polarized in the P state. The beams from the two laser diodes 805a and 805b become collinear after passing through a polarizing beam-splitter 809 and subsequently pass through a beam-forming hologram 807.

The S polarized light is reflected off polarizing beam-splitter 811 toward a reflective spatial light modulator 830. For the individual beams that are modulated, the state of polarization is rotated by 90 degrees and becomes P-polarized, allowing the write beams to pass through a beam-splitter 813. Read beams in the P state pass through polarizing beam-splitter 811 and reflect from a tiltable RAW mirror 820. A double pass through a quarter wave plate 815 located between RAW mirror 820 and beam-splitter 811 rotates polarization of the read beams from the P state to the S state, allowing them to reflect from beam-splitter 811 toward a recording medium 845 via a focusing objective lens 840. Beam-splitter 813 transmits nominally 98% of P-polarized light while reflecting about 50% of S-polarized light. The remaining 50% of S-polarized light is transmitted through beam-splitter 813 to the recording medium 845 as the RAW beams. The same implementations of the beam array positioning and RAW mirror actuator as described in conjunction with previous embodiments are applicable.

The S-polarized light reflected from beam-splitter 813 travels to a beam-splitter 850. Part of the S-polarized light which enters beam-splitter 850 is reflected to a data detector 865, while the remaining S-polarized light passes through beam-splitter 850 to a focus and track detector 860. In one embodiment, beam-splitter 850 reflects approximately 50% of S-polarized light. The remaining S-polarized light is transmitted through beam-splitter 850. Detector 860 and focus and track actuator 810 are used to maintain lens 840 in the desired focal and tracking position.

In another optical recording system 900 shown in FIG. 10, the two individual laser diodes shown in FIG. 9 are replaced by an integrated laser diode array 905. One laser diode 905a (high power) is used to generate the write beam and the other laser diode 905b (low power) is used to generate the read beam. In this embodiment, the write laser diode 905a is polarized in the S state, and the read laser diode 905b is polarized in the P state. The light from both diodes 905a and 905b pass through a beam-forming hologram 907 to form two arrays of beams which enter a polarizing beam-splitter 909. The S-polarized light from diode 905a is reflected from beam-splitter 909 toward a reflective spatial light modulator 930. In one embodiment, approximately 98% of S-polarized light is reflected from beam-splitter 909. The beams which are modulated by modulator 930 become P-polarized write beams, allowing them to pass through another polarizing beam-splitter 911 to a recording medium 945 via a focusing objective lens 940. In one embodiment, approximately 97% of P-polarized light passes through beam-splitter 911.

The P-polarized light from diode 905b passes through beam-splitter 909 and reflects from a RAW mirror 920. In one embodiment, approximately 97% of P-polarized light passes through beam-splitter 909. A double pass through a quarter wave plate 915 located between RAW mirror 920 and beam-splitter 909 changes the polarization of the read beams from the P state to the S state, allowing them to reflect from beam-splitter 909 toward recording medium 945 via lens 940. In one embodiment, approximately 50% of S-polarized light is reflected from beam-splitter 911. The remaining 50% of S-polarized light passes through beam-splitter 911 to recording medium 945 to read the written tracks on recording medium 945.

The S-polarized light reflected from beam-splitter 911 travels to a beam-splitter 913. Part of the S-polarized light which enters beam-splitter 913 is reflected from beam-splitter 913 to a focus and track detector 960, while the rest of the S-polarized light passes through to a data detector 965. In one embodiment, beam-splitter 913 reflects approximately 50% of S-polarized light. The remaining S-polarized light passes through beam-splitter 913. Detector 960 and focus and track actuator 910 are used to maintain lens 940 in the desired focal and tracking position.

A RAW actuator (not shown) controls the adjustment of RAW mirror 920 to position the read beam array in the down track location of the write beam array on the tape depending on the direction of motion of recording medium 945. So that the trailing read beam array is in line with the write beam array regardless of the direction of the tape motion, the laser diode array may be rotated by negative $\tan^{-1}(1/M)$ for an N×M beam array.

In yet another optical recording system 1000 shown in FIG. 11, the two laser diodes and the adjustable RAW mirror are replaced by an array of three laser diodes and a fixed RAW mirror. In this embodiment, the center high power laser diode 1005a is the write beam source, and the two adjacent lower power laser diodes 1005b and 1005c are the sources of the read beams. Arrays of beams are formed using a beam-forming hologram 1007. The read laser diodes 1005b and 1005c turn on one at a time depending on the direction of motion of recording medium 1045. Because the read laser diodes 1005b and 1005c are offset from the center laser diode 1005a, their image onto recording medium 1045 is also to the side of the write beam with a distance determined by the magnification of the optical system. So that the trailing read beam array is in line with the write beam array regardless of the direction of the tape motion, the laser diode array may be rotated by negative $\tan^{-1}(1/M)$ for an N×M beam array. In the embodiment shown in FIG. 11, there is no need for a tilting RAW mirror due to the presence of the offset read laser diodes 1005b and 1005c. In effect, the read beams are pre-positioned relative to the write beams based on the distance between diodes 1005b and 1005a, and between diodes 1005c and 1005a.

The read beams are P-polarized in order to pass through polarizing beam-splitter 1009 after passing through a beam-forming hologram. With the aid of a quarter wave plate 1015 placed between polarizing beam-splitter 1009 and fixed RAW mirror 1020, the reflected read beam array will become S-polarized and reflect from beam-splitter 1009 toward another polarizing beam-splitter 1011. Part of the read beams reflect from beam-splitter 1011 to a beam-splitter 1013, while the remaining portion of the read beams pass through to recording medium 1045 via a focusing objective lens 1040. Part of the S-polarized light which enters beam-splitter 1013 is reflected to a focus and track detector 1060, while the remaining S-polarized light passes through to a data detector 1065. Detector 1060 and focus and track actuator 1010 are used to maintain lens 1040 in the desired focal and tracking position.

The write beam array is initially S-polarized at the output of laser diode 1005a. The S-polarized write beam array is reflected from beam-splitter 1009 toward a reflective spatial light modulator 1030. For the individual beams that are modulated, the state of polarization is rotated by 90 degrees to a P state, allowing the write beams to pass through beam-splitter 1009 upon returning from modulator 1030. The P-polarized write beams pass through beam-splitter 1011 and are focused onto recording medium 1045 by lens 1040.

In the foregoing detailed description, the apparatus and method of the present invention have been described with reference to specific exemplary embodiments. For example, beam-splitters having specific reflection and transmission properties have been described. However, it is appreciated that the present invention is not limited to using such beam-splitters. In fact, it will be evident that various modifications and changes may be made without departing from the broader scope and spirit of the present invention. The present specification and figures are accordingly to be regarded as illustrative rather than restrictive.

What is claimed is:

1. An optical apparatus comprising
   a mirror for an optical recording system, wherein said mirror is coupled to an adjustable base moveably coupled to a fixed support, and wherein said adjustable base is adjustable to orient said mirror in at least a first position to reflect a plurality of reading light beams of said optical recording system onto a recording medium; and
   a stop structure adjacent said adjustable base, said stop structure having a first protrusion and a second protrusion, said first and second protrusions defining a range of adjustability of said adjustable base.

2. The optical apparatus of claim 1, wherein each of said reading light beams is reflected onto said recording medium to read a separate written track on said recording medium.

3. The optical apparatus of claim 2, wherein said plurality of reading light beams is reflected from said mirror in said first position onto said recording medium when said recording medium is moving in a first direction.

4. The optical apparatus of claim 1, wherein said adjustable base is adjustable to orient said mirror in a second position to reflect said plurality of reading light beams onto said recording medium.

5. The optical apparatus of claim 4, wherein said plurality of reading light beams is reflected from said mirror in said second position onto said recording medium when said recording medium is moving in a second direction.

6. The optical apparatus of claim 1, wherein said mirror is partially reflective.

7. The optical apparatus of claim 1, wherein said adjustable base comprises a flange capable of contacting said first and second protrusions.

8. The optical apparatus of claim 1, wherein said first and second protrusions are moveable.

9. The optical apparatus of claim 1, wherein said first and second protrusions are fixed.

10. The optical apparatus of claim 1, wherein said first and second protrusions extend from an outer surface of said stop structure.

11. The optical apparatus of claim 1, wherein said first and second protrusions extend from an inner surface of said stop structure.

12. The optical apparatus of claim 11, wherein said adjustable base comprises a flange extending within said stop structure.

13. The optical apparatus of claim 1, wherein said adjustable base is electromagnetically adjustable.

14. The optical apparatus of claim 6, wherein said mirror has a reflectivity in the range of approximately 5–10%.

15. An optical apparatus comprising:
    a mirror for an optical recording system, wherein said mirror is coupled to an adjustable base moveably coupled to a fixed support, and wherein said adjustable base is adjustable to orient said mirror in at least a first position to reflect a plurality of reading light beams of said optical recording system onto a recording medium; and
    wherein said mirror is partially reflective.

16. The optical apparatus of claim 15, wherein said mirror has a reflectivity in the range of approximately 5–10%.

17. The optical apparatus of claim 15, wherein each of said reading light beams is reflected onto said recording medium to read a separate written track on said recording medium.

18. The optical apparatus of claim 17, wherein said plurality of reading light beams is reflected from said mirror in said first position onto said recording medium when said recording medium is moving in a first direction.

19. The optical apparatus of claim 15, wherein said adjustable base is adjustable to orient said mirror in a second position to reflect said plurality of reading light beams onto said recording medium.

20. The optical apparatus of claim 19, wherein said plurality of reading light beams is reflected from said mirror in said second position onto said recording medium when said recording medium is moving in a second direction.

21. The optical apparatus of claim 15, further comprising:
    a stop structure adjacent said adjustable base, said stop structure having a first protrusion and a second protrusion, said first and second protrusions defining a range of adjustability of said adjustable base.

22. The optical apparatus of claim 21, wherein said adjustable base comprises a flange capable of contacting said first and second protrusions.

23. The optical apparatus of claim 21, wherein said first and second protrusions are moveable.

24. The optical apparatus of claim 21, wherein said first and second protrusions are fixed.

25. The optical apparatus of claim 21, wherein said first and second protrusions extend from an outer surface of said stop structure.

26. The optical apparatus of claim 21, wherein said first and second protrusions extend from an inner surface of said stop structure.

27. The optical apparatus of claim 26, wherein said adjustable base comprises a flange extending within said stop structure.

28. The optical apparatus of claim 15, wherein said adjustable base is electromagnetically adjustable.

29. A method of performing a read-after-write operation in an optical recording system, the method comprising:
    adjusting a mirror to one of a first angled position and a second angled position; directing an unmodulated light beam from a light source to said mirror, said unmodulated light beam reflecting from said mirror onto a lens;
    using said lens to focus said unmodulated light beam at an incident position on a recording medium, wherein said unmodulated light beam is capable of reading a written track on said recording medium immediately after said written track is written; and wherein:
        said mirror is adjusted to said first angled position when said recording medium is moving in a first direction, and wherein said mirror is adjusted to said second angled position when said recording medium is moving in a second direction.

30. A method of performing a read-after-write operation in an optical recording system, the method comprising:
    adjusting a mirror to one of a first angled position and a second angled position; directing an unmodulated light beam from a light source to said mirror, said unmodulated light beam reflecting from said mirror onto a lens;
    using said lens to focus said unmodulated light beam at an incident position on a recording medium, wherein said unmodulated light beam is capable of reading a written track on said recording medium immediately after said written track is written;
    directing a portion of said unmodulated light beam to a reflective light modulator, said portion reflecting from said reflective light modulator in a modulated state; and
    using said modulated portion to write said written track on said recording medium.

* * * * *